United States Patent [19]

Monin

[11] Patent Number: 5,080,476
[45] Date of Patent: Jan. 14, 1992

[54] EYEGLASS FRAME TEMPLE MEMBER HAVING A REPLACEABLE BODY MEMBER COMPONENT

[75] Inventor: Jean M. Monin, Pontault-Combault, France

[73] Assignee: Essilor International Compagnie Generale d'Optique, Creteil, France

[21] Appl. No.: 578,149

[22] Filed: Sep. 6, 1990

[30] Foreign Application Priority Data

Sep. 7, 1989 [FR] France ............... 89 11701

[51] Int. Cl.⁵ ............................................. G02C 5/14
[52] U.S. Cl. ................................. 351/119; 351/111; 351/121
[58] Field of Search ............... 351/116, 119, 121, 153, 351/111; 2/448, 449, 450

[56] References Cited

U.S. PATENT DOCUMENTS

| 4,488,792 | 12/1984 | Wagner | 351/153 |
| 4,564,272 | 1/1986 | Rinnooy Kan | 351/153 |

FOREIGN PATENT DOCUMENTS

| 0115826 | 8/1984 | European Pat. Off. | |
| 87310 | 6/1966 | France | |
| 2384275 | 10/1978 | France | |
| 2398322 | 2/1979 | France | |
| 2485755 | 12/1981 | France | |
| 2543312 | 9/1984 | France | |

Primary Examiner—Rodney B. Bovernick
Attorney, Agent, or Firm—Charles A. Brown

[57] ABSTRACT

An eyeglass frame temple member comprises a replaceable or interchangeable temple body component, an intermediate member for pivotally mounting the temple body component. The intermediate member includes a first hinge part, a complementary second hinge part adapted to be fixed relative to an eyeglass frame front. The intermediate member comprises a male part longitudinally elongate in a direction parallel to a longitudinal axis of the temple body component. The temple body component has recess complementary in size and configuration to that of the male part for receiving the same. A longitudinal passageway extends through the male part. A bearing surface is provided in the passageway. A threaded fastener is received in the passageway. A fastener bore extends the recess in the male part and is aligned with the passageway in the male part when the male part is received in the recess. The threaded fastener is threadedly engageable with the fastener bore.

8 Claims, 1 Drawing Sheet

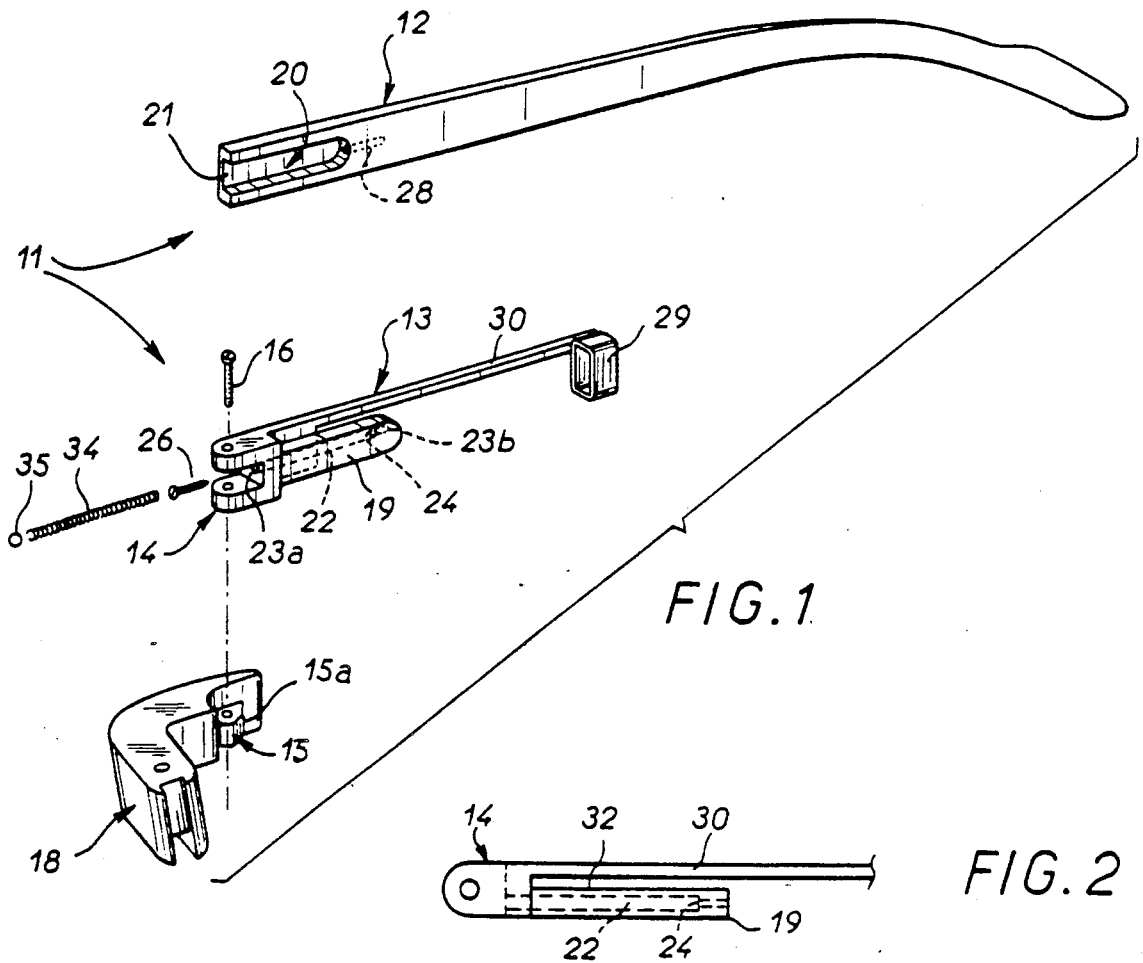
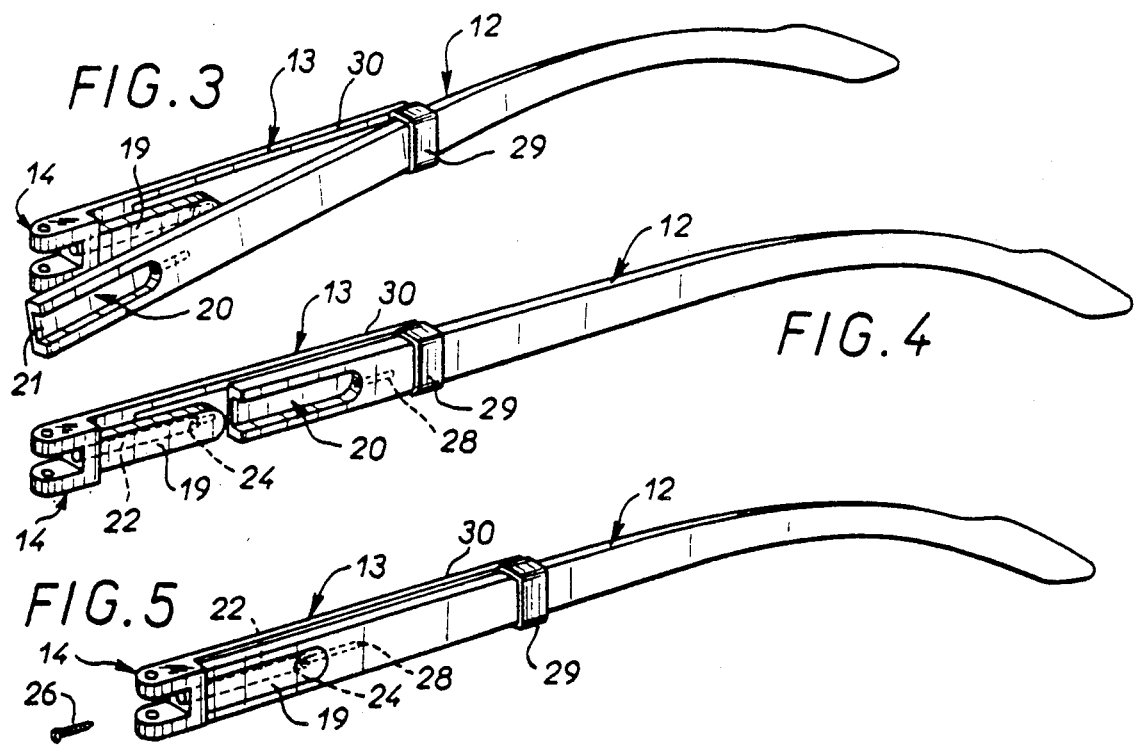

EYEGLASS FRAME TEMPLE MEMBER HAVING A REPLACEABLE BODY MEMBER COMPONENT

BACKGROUND OF THE INVENTION

The present invention relates to temples members or side supports of an eyeglass frame and more particularly to an improvement permitting the replaceability of such temple body components thereof.

Eyeglass frames are known which are designed to readily change temple body components for the temple members or side supports. By way of example French patent application No. 2,543,312 is cited, which discloses an arrangement simultaneously ensuring the mutual securement of the temple part of the hinge, a mounting sleeve and a temple body component per se. The assembly is effected by means of a visible side screw which is detrimental to the aesthetics of the eyeglass frame. Further, the screw can unloosen which will produce play in the assembly or even the loss of the screw itself, as the latter is not otherwise retained.

SUMMARY OF THE INVENTION

An object of the present invention is a novel arrangement which mitigates or even eliminates the foregoing drawbacks.

According to the invention there is provided a temple member of an eyeglass frame, comprising a replaceable temple body component, an intermediate member for pivotally mounting the temple body component including a first hinge part, a second hinge part being adapted to be fixed relative to a frame front, characterized in that the intermediate member comprises a male part elongate in a longitudinal direction substantially parallel to a longitudinal axis of the temple body component and having a passageway extending longitudinally therethrough, a threaded fastener being engageable in said passageway, said passageway having a bearing means cooperable with said threaded fastener, the temple body component having, at an end thereof, a recess of configuration and size corresponding to said male part and a fastener bore extending said recess and in alignment with the passageway in the intermediate member when said male member is engaged in said recess, said threaded fastener being threadedly engageable with said fastener bore.

The invention will be better understood from, and other features and advantages thereof will be brought out in, the following description of a temple member for an eyeglass frame according to the invention, given solely by way of example with reference to the accompanying drawings.

BRIEF DESCRIPTION OF THE DRAWINGS

FIG. 1 is an exploded perspective view of the various parts of an eyeglass frame temple member according to the invention;

FIG. 2 is a partial side view on a smaller scale showing an intermediate member comprising a first hinge part; and FIGS. 3 to 5 show the successive steps of assembly the temple body component on the intermediate member.

DESCRIPTION OF THE PREFERRED EMBODIMENT

Referring particularly to FIG. 1, an eyeglass frame temple member 11 is illustrated comprising a replaceable or interchangeable temple body component 12 and an intermediate member 13 including a first hinge part 14 here defining a yoke having a pair of transversely spaced lugs. A second hinge part 15 comprises a single lug sized and shaped to pivot relative to the first hinge part 14 between the pair of spaced lugs and about a pivot axis defined by a screw 16 which extends through aligned holes in the first and second hinge parts 14, 15. The second hinge part 15 forms part of a temple member support 18 which is adapted to be fixed to or form part of an eyeglass frame front or bow (not shown).

According to an important feature of the invention the intermediate member 13 comprises a male part 19 which is longitudinally elongate substantially in a direction parallel to the generally longitudinal axis of the temple member. The temple body component 12 comprises at its forward or mounting terminal end a recess 20 of configuration and size complementary to the male part for mating engagement therewith. The term recess is intended to encompass a mortise or through slot in which the male part 19 is adapted to fit or matingly engage, or a recess 20 as illustrated in which the lateral wall or web 21 in continuity with the outer surface of the temple body component limits the recess laterally. In the illustrated embodiment the male part 19 has a generally rectangular section with a rounded free end. Other configurations can of course be contemplated, in particular such a rib with a dovetail or the like.

The male part 19 extends from the first hinge part 14 and is provided with an internal passageway or bore 22 which extends longitudinally therethrough from one end to the other. The opening 23a of the passageway 22 located adjacent the first hinge part 14 is therefore hidden from view by the second hinge part when the hinge parts are assembled. More particularly, the passageway 22 extends through the first hinge part 14 such that the opening 23a opens on a transverse wall extending between the spaced lugs of the yoke of the second hinge part 14. The other opening 23b opens on to the middle of the rounded end of the male part 19. A shoulder 24 or other bearing surface is provided inside the passageway 22, relatively adjacent the opening 23b so that the head of the threaded fastener can come into bearing against shoulder 24 engagement inside the passageway.

Moreover, the blind fastener hole 28, optionally threaded, and adapted to receive the threaded shank of the threaded fastener 26 is provided in the temple body component 12 and forming an extension of the passageway 22 after assembly. In particular the fastener hole 28 opens onto rounded end of the recess 20.

In addition to the first hinge part 14, the intermediate member 13 comprises a retainer ring 29 of rectangular section remote from the first hinge part and traversed by the temple body component 12 (FIG. 5). The ring 29 is connected to the first hinge part 14 by a lateral support arm 30 which is in contact with the outer surface of the temple body component 12 after assembly. The ring 29 is welded to the end of the arm 30 whereas the male part 19 is fixed (for example at its corresponding end) to the intermediate member 13 behind the first hinge part so that there remains a lateral space 32 between the male part 19 and the lateral support arm 30 to permit the insertion of a portion of the terminal part of the temple body component, in the present case part of web 21 in this space. Such an assembly improves the precision and the sturdiness of the resulting assembly.

The mounting of the temple body component 12 on the intermediate member 13 is performed by a series of simple steps illustrated in FIGS. 3 to 5. Preferably the temple body component 12 is first introduced into the retainer ring 29 from its outboard side (FIG. 3) until the front end of the temple body component clears the rounded end of the male part (FIG. 4), then the front end of the temple body component 12 is slid back parallel to the intermediate member 13 until the male part is fully received in the recess 20. Thereupon the threaded fastener 26 is inserted down the passageway the male part 19 brought into threaded engagement with the bore 28 in the temple body component and tightened until the head of the screw comes into bearing engagement with the bearing surface 24.

Referring again to FIG. 1, it should be noted that simple lug of the second hinge part 15 which is received between the spaced lugs of the yoke of the first hinge part 14 is configured to define a cam surface 15a. Passageway 22 further accommodates resilient biasing means comprising a coil spring 34 and a small ball 35, in the illustrated embodiment. In this manner when the first and second hinge parts 14, 15 are assembled by means of hinge pin screw 16, the ball 35 is urged against the cam surface 15a comprising lateral surface of the second hinge part 15. The lateral profile of the cam surface 15a on the second hinge part 15 is designed to define a stable position of the temple member. Means for defining a stable temple member position are known per se, but in the present invention is constructed and arranged in a particularly simple and advantageous manner in that it makes use of the passageway 22 which accommodates the threaded fastener 26. Furthermore, the fact that the spring 34, bear against the head of the threaded fastener 26 advantageously reduces the risk of its becoming unloosened.

It will be apparent to those skilled in the art that the present invention admits of various modifications and variants without departing from the scope of the appended claims.

What I claim is:

1. A eyeglass frame temple member, comprising a replaceable temple body component, an intermediate member for pivotally mounting the temple body component including a first hinge part, a second hinge part being adapted to be fixed relative to a frame front, characterized in that the intermediate member comprises a male part elongate in a longitudinal direction substantially parallel to a longitudinal axis of the temple body component and having a passageway extending longitudinally therethrough, a threaded fastener being engageable in said passageway, said passageway having a bearing means cooperable with said threaded fastener, the temple body component having, at an end thereof, a recess of configuration and size corresponding to said male part and a fastener bore extending said recess and in alignment with the passageway in the intermediate member when said male member is engaged in said recess, said threaded fastener being threadedly engageable with said fastener bore.

2. A temple member according to claim 1, wherein said passageway has an opening on to said second hinge part, said first hinge part hiding said opening when said hinge parts are in assembled relation.

3. A temple member according to claim 2, wherein said first hinge part comprises a yoke including transversely spaced lugs, said opening of said passageway opening on to a transverse wall of said yoke extending between said lugs.

4. A temple member according to claim 3, wherein said second hinge part defines a lateral cam surface and that said passageway contains, resilient biasing means cooperable with said cam surface for defining a stable position of said first and second parts relative to each other.

5. A temple member according to claim 4, wherein said intermediate member comprises a retainer ring longitudinally spaced from said first hinge part, said retainer ring adapted to receive said temple body component.

6. A temple member according to claim 5, wherein a lateral support arm connects said retainer ring to said first hinge part.

7. A temple member according to claim 6, wherein said male part is permanently fixed to said intermediate member, a transverse space being defined between said male part and said lateral support arm, said temple body component having a forward end portion adapted to be received in said transverse space.

8. A temple member according to claim 7, wherein said forward end portion comprises a lateral wall of said recess.

* * * * *